(12) United States Patent
Ore

(10) Patent No.: US 6,698,312 B1
(45) Date of Patent: Mar. 2, 2004

(54) TORQUE DISCONNECT MECHANISM WITH BRAKE INTERLOCK

(75) Inventor: Thomas G. Ore, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/217,301

(22) Filed: Aug. 12, 2002

(51) Int. Cl.$^7$ .......................... F16H 57/02; F16D 65/24; F16D 67/02
(52) U.S. Cl. ................... 74/606 R; 188/170; 192/13 R; 192/69.9
(58) Field of Search .......................... 188/170; 303/71; 475/91, 116, 125, 140; 74/606 R, 333, 337.5; 192/13 R, 69.9

(56) References Cited

U.S. PATENT DOCUMENTS

| | | | | |
|---|---|---|---|---|
| 3,612,225 A | * | 10/1971 | Evans | 188/72.6 |
| 4,186,822 A | * | 2/1980 | Khuntia et al. | 188/1.11 W |
| 4,534,746 A | * | 8/1985 | Hausinger | 464/170 |
| 4,709,793 A | * | 12/1987 | Sakakibara et al. | 192/219.4 |
| 4,779,433 A | * | 10/1988 | Legare | 70/211 |
| 4,938,307 A | * | 7/1990 | Sasaki et al. | 180/247 |
| 5,180,038 A | * | 1/1993 | Arnold et al. | 188/171 |
| 5,234,278 A | * | 8/1993 | Hall et al. | 403/359.5 |

OTHER PUBLICATIONS

Deere & Company, Park Brake, 2001.

* cited by examiner

Primary Examiner—Tisha D Lewis

(57) ABSTRACT

A vehicle transmission has first and second shafts rotatable in a housing, a spring applied, pressure released brake mechanism for preventing vehicle movement, and a torque disconnect mechanism for controlling transmission of torque from the first shaft to the second shaft. An interlock mechanism includes an opening formed in the housing through which an operator may access the torque disconnect mechanism, a fluid pressure supply passage for communicating pressurized fluid to the brake mechanism, a dump port formed in the housing in a wall of the opening, a pressure dump passage communicating the supply passage with the dump port, and a plug member mountable in the opening. The plug member closes the dump port and closes communication between the dump passage and the environment when the plug member is mounted in the opening The dump port and the dump passage are communicated with the environment, and the brake is spring applied when the plug member is removed from the opening.

5 Claims, 1 Drawing Sheet

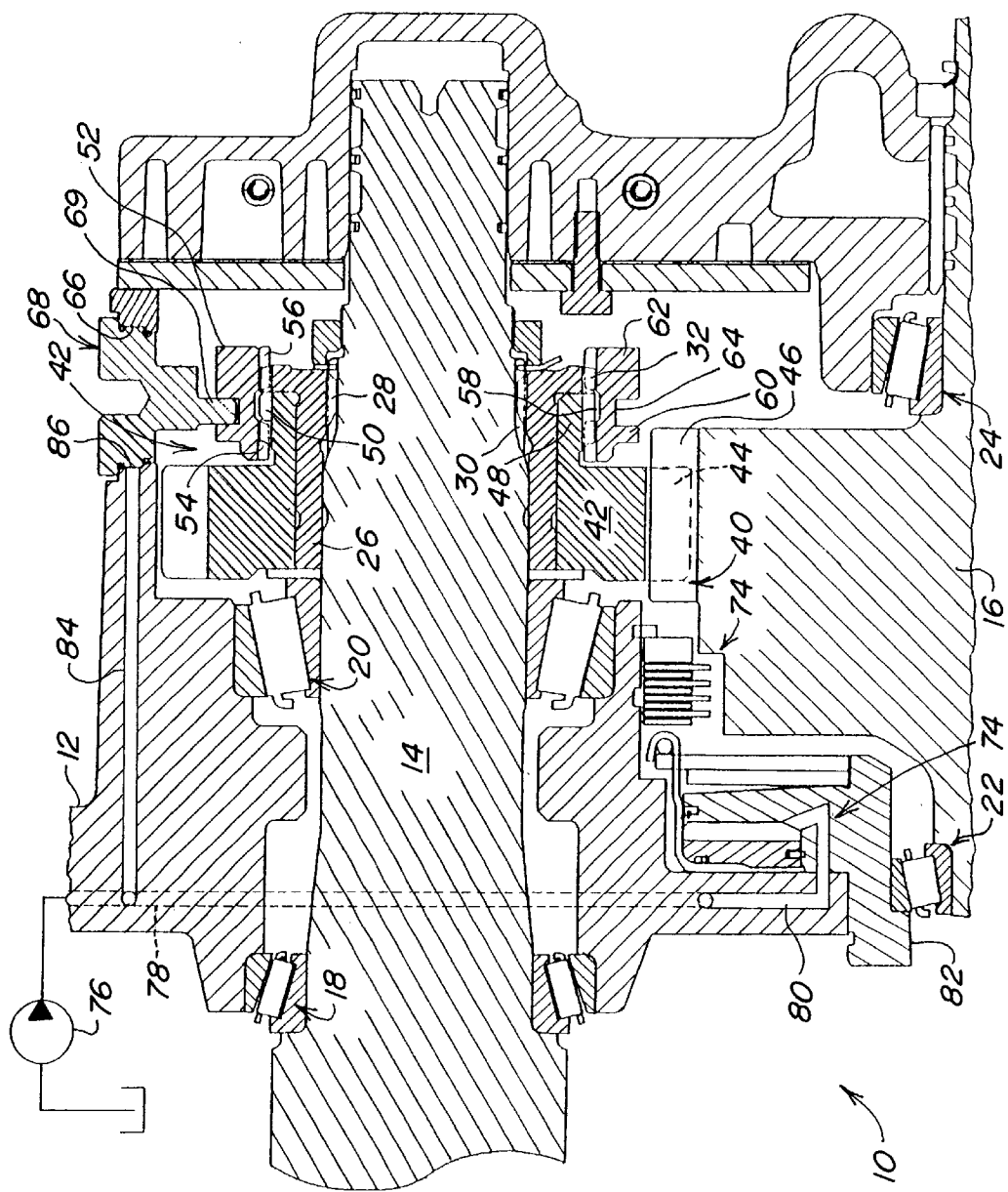

TORQUE DISCONNECT MECHANISM WITH BRAKE INTERLOCK

BACKGROUND OF THE INVENTION

The present invention relates to an interlock mechanism for operatively coupling a torque disconnect mechanism and a brake mechanism in a vehicle.

When servicing or diagnosing a transmission it is desirable to disconnect the transmission output shaft and prevent torque from being transmitted to the output shaft. It has been proposed to have a torque disconnect mechanism which includes a shift collar which is accessible though an opening in a transmission housing when a removable plug is removed from the opening. It would be desirable to prevent vehicle movement while an operator removes the plug to operate the torque disconnect collar.

SUMMARY

Accordingly, an object of this invention is to provide a mechanism which prevents vehicle movement while an operator manipulates a torque disconnect mechanism.

These and other objects are achieved by the present invention, wherein a transmission includes a parking brake which is spring engaged and which is disengaged by hydraulic pressure. A torque disconnect mechanism controls transmission of torque from a first shaft to a second shaft in a transmission. The torque disconnect mechanism includes a movable shift collar inside a housing. The shift collar is accessible through an opening in the housing. A plug member is mounted in the opening and is removable to provide access to the shift collar. The housing includes a hydraulic fluid passage which communicates the park brake pressure supply line to an aperture in the opening. When the plug member is removed from the opening the aperture is opened to the environment, fluid pressure is relieved from the park brake pressure supply line and the park brake is spring applied.

BRIEF DESCRIPTION OF THE DRAWINGS

The sole FIGURE is a simplified partial sectional view of the present invention.

DETAILED DESCRIPTION

A transmission 10 includes a housing 12 which rotatably supports a shaft 14 and a transmission output shaft 16. Shaft 14 may be a planetary output shaft and shaft 16 may be a transmission output shaft. Shaft 14 is supported by bearings 18 and 20, while shaft 16 is supported by bearings 22 and 24. A hollow hub gear 26 is mounted on shaft 14. Gear 26 includes inner splines 28 which engage outer splines 30 on the shaft 14. Gear 26 also includes outer splines 32.

A drive gear 40 is rotatably mounted on a portion of the hub gear 26. Drive gear 40 includes a large diameter part 42 on which are formed splines 44. Splines 44 engage corresponding splines 46 on shaft 16. Drive gear 40 also includes a smaller diameter part 48 on which are formed splines 50 which are axially adjacent to splines 32 of hub gear 26.

An annular collar or coupling member 52 is mounted over the splines 50 and 32. Collar 52 has a generally cylindrical body with a pair of axially spaced apart sets of splines 54 and 56 separated by an radially inwardly opening annular groove 58. The outer surface of the collar 52 forms a pair of lands 60 and 62 separated by an outer annular groove 64.

Housing 12 includes an opening 66 through which an operator can access the collar 52. A service disconnect plug 68 is removably mounted in the opening 66. Plug 68 includes a tab 69 which is engageable with the groove 64 in the collar 52.

The assembly also includes a conventional spring applied, pressure released park brake 74 which is engageable to prevent rotation of output shaft 16. A pressure source 76, which may be a conventional manually operated park brake pump, supplies a limited volume of pressurized fluid to the park brake 74 via brake pressure supply passages 78 and 80 which are formed in the housing 12 and in a park brake housing member 82. A pressure dump passage 84 is also formed in the housing 12 and communicates passage 78 to a port 86 formed in the opening 66.

The collar 52 may be placed in an engaged position, shown in FIG. 1, wherein splines 54 and 56 are in meshing engagement with splines 50 and 32, respectively, and torque can be transmitted from shaft 14 to shaft 16.

To disengage shaft 14 from shaft 16, the plug 68 is removed from opening 66 and a tool (not shown) is inserted through opening 66 and into grove 64, and the tool is then manipulated to slide collar 52 to the right into the disengaged position. Removal of plug 68 from opening 66 opens port 86, communicates park brake 74 to atmosphere via passages 80, 78 and 84, and causes park brake 74 to engage and prevent rotation of shaft 16.

The plug 68 may then preferably be re-oriented so that the tab 69 is oriented to the right, and then plug 68 is re-inserted back into opening 66 so that tab 69 is received by groove 64. Tab 69 thereby holds collar 52 in its disengaged position wherein splines 56 are uncoupled from splines 32 and torque cannot be transmitted from shaft 14 to shaft 16.

Plug 68 has a generally cylindrical head in which are formed a pair of grooves for receiving 0-ring seals. When plug 68 is installed in the opening 66 the port 86 is sealed, and passages 84, 78 and 80, and the brake 74 remain pressurized and disengaged.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. In a vehicle transmission having first and second shafts rotatable in a housing, a spring applied, pressure released brake mechanism for preventing vehicle movement and a torque disconnect mechanism for controlling transmission of torque from the first shaft to the second shaft, an interlock mechanism comprising:

an opening formed in the housing through which an operator may access the torque disconnect mechanism;

a fluid pressure supply passage for communicating pressurized fluid to the brake mechanism;

a dump port formed in the housing in a wall of the opening;

a pressure dump passage communicating the supply passage with the dump port; and a plug member mountable in the opening, the plug member closing the dump port and closing communication between the dump passage and the environment when the plug member is mounted in the opening, and the dump port and the dump passage being communicated with the environment when the plug member is removed from the opening.

2. The interlock mechanism of claim 1, wherein:

the fluid pressure supply passage and the pressure dump passage are formed in the housing.

3. A power transmission comprising:

first and second shafts rotatable in a housing;

a torque disconnect mechanism for controlling transmission of torque from the first shaft to the second shaft;

an opening formed in the housing through which an operator may access the torque disconnect mechanism;

a plug member removably mountable in the opening;

a brake mechanism engagable to prevent rotation of the second shaft; and an interlock mechanism operatively interconnecting the plug member and the brake mechanism, the interlock mechanism operating to cause the brake mechanism to engage when the plug member is removed from the opening.

4. The power transmission of claim 3, wherein:

the brake mechanism comprises a spring applied, pressure released brake communicated with a source of brake pressure via a supply passage; and the interlock mechanism comprises a dump port formed in the housing in a wall of the opening, a pressure dump passage communicating the supply passage with the dump port, the plug member closing the dump port and closing communication between the dump passage and the environment when the plug member is mounted in the opening, and the dump port and the dump passage being communicated with the environment when the plug member is removed from the opening.

5. The interlock mechanism of claim 4, wherein:

the supply passage and the pressure dump passage are formed in the housing.

* * * * *